Patented Feb. 25, 1936

2,031,917

UNITED STATES PATENT OFFICE 2,031,917

METHOD OF INHIBITING GUM FORMATION IN NAPHTHAS AND PRODUCTS OBTAINED THEREBY

Carl Winning, Leonard E. Sargent, and James F. Dudley, Elizabeth, N. J., assignors to Standard Oil Development Company, a corporation of Delaware No Drawing. Application April 24, 1931, Serial No. 532,706

11 Claims. (Cl. 44—9)

The present invention relates to a method of inhibiting or retarding gum formation in low boiling hydrocarbon oils and will be fully understood from the following description:

Naphthas containing large quantities of gum or constituents tending to form gum during storage or in sunlight are objectionable for many purposes, such as motor fuels, light solvents, etc. Recently a careful study of gum formation has been made by chemists and several organic compounds have been found which, when added in small quantities to low boiling hydrocarbon oils, will retard or inhibit gum formation for periods of time varying with the nature of the compound, the oil and other conditions. U. S. application Serial No. 497,334, of Carlos L. Gutzeit filed November 21, 1930, proposes the use of dyes, such as indo-phenols and oxazine-, indamine-, eurhodine-, safranine-, apo-safranine and amino azo-bases which lose their color before losing their inhibiting power.

The present invention relates to an improvement of the process described in the application cited.

When a dye is used alone as gum inhibitor, the concentration required to inhibit gum formation in storage is usually around one part by weight of dye in 10,000 or 20,000 parts of naphtha. With most dyes, however, the proper color of the dyed gasoline can be obtained in concentrations as low as one part of dye in 100,000 or in 200,000 parts of naphtha. One aspect of the present invention relates to the addition to naphtha of a dye gum inhibitor in concentration insufficient to provide effective gum inhibition together with a substantially colorless gum inhibitor to prevent gum formation during storage in the absence of sunlight. The expression "effective gum inhibition" is meant to designate the protection of the naphtha against gum formation on six months' storage in the absence of sunlight. Such a combination of a dye and a colorless gum inhibitor will provide effective gum inhibition during storage and the extremely small quantity of dye will insure all the benefits which can be obtained from using a dye alone as gum inhibitor. The dye in such a combination serves as an indicator inasmuch as the color of the naphtha containing the combined gum inhibitor will fade before the inhibition power ceases. Examples of colorless gum inhibitors which may be added to gasoline in conjunction with a minute quantity of dye inhibitor are the following: alpha naphthol, secondary amyl para-amino phenol, hexyl para-phenylene diamine, etc. The following examples will serve to illustrate naphthas stabilized against gum formation in storage by the combined gum inhibitors above described.

| | Per cent |
|---|---|
| The blue dye obtained by the condensation of a naphthol with para-nitroso dimethyl aniline | 0.001 |
| Alpha naphthol | 0.010 |
| Gasoline | 99.989 |

| | Per cent |
|---|---|
| The red dye obtained by the condensation of diphenyl amine with para-nitroso phenol | 0.0007 |
| Secondary amyl para-amino phenol | 0.0100 |
| Gasoline | 99.993 |

Both of these dyes belong to the indophenols. The colorless gum inhibitors used in the above combination will prevent gum formation on long standing in storage in the absence of sunlight; they will, however, change when exposed to sunlight. Thus, for example, alpha naphthol turns blue in sunlight and could not be used with great efficiency to prevent gum formation in gasolines which are exposed to sunlight.

The second aspect of the present invention, relates to the addition to naphtha of a combined dye inhibitor and colorless inhibitor, the latter being a light stable colorless inhibitor, such as for example, aniline, phenol and other homologues and derivatives, ortho-, meta-, and paracresol, etc. The colorless inhibitor in this case will protect the dye against fading in the sunlight as long as the combined inhibitor is able to effectively prevent gum formation in the gasoline. In some cases the colorless inhibitor used is a comparatively poor inhibitor in itself, for example, aniline or phenol, but in combination with a powerful dye inhibitor it will have the effect of protecting the dye inhibitor against fading in the sunlight. The dye inhibitor in this case is added in an amount sufficient not only to color the naphtha but also to prevent gum formation therein. The expression "light stable colorless inhibitor" is meant to designate a gum inhibitor whose solution in gasoline will not discolor noticeably to the naked eye when exposed for 4 hours to strong sunlight in a 4 ounce glass bottle. The preferred concentrations of the constituents of the combined inhibitor are the following: dye 0.002–0.01 per cent, colorless inhibitor 0.01–0.05 per cent by weight of the naphtha. The percentages may vary but the total amount of the combined gum inhibitor is usually below 0.1 per cent.

The following examples will be given for the purpose of illustration:

| | Per cent |
|---|---|
| The blue die obtained by the condensation of alpha naphthol with para-nitroso dimethyl aniline | 0.005 |
| Mono methyl aniline | 0.020 |
| Naphtha | 99.975 |

| | Per cent |
|---|---|
| The red dye obtained by the condensation of diphenyl amine with para-nitroso phenol | 0.003 |
| Tricresol | 0.020 |
| Gasoline | 99.977 |

In both modifications of our process the amount of the combined gum inhibitor is very small and is usually less than 0.1 per cent by weight of the naphtha. The combined gum inhibitor is in general sufficiently oil soluble and may be readily distributed uniformly throughout, even large bodies of oil by simple mixing means. If desirable they may be dissolved in benzene or other suitable solvent.

Having thus described our invention what we claim is:

1. A motor fuel comprising cracked hydrocarbon spirits of the type normally tending to form gum containing a colorless gum inhibitor selected from aromatic amino and phenolic compounds in quantity sufficient to inhibit gum formation, and a dye selected from the group consisting of indophenols and oxazine-, indamine-, eurhodine-, safranine-, and aposafranine bases in quantity sufficient to impart color to the fuel and further stabilize the gasoline against gum formation.

2. Motor fuel according to claim 1, in which the inhibitor dye is present in an amount between the approximate limits of 0.0005% and 0.001%.

3. Motor fuel according to claim 1, in which alpha-naphthol is used as the colorless gum inhibitor.

4. Motor fuel according to claim 1, in which an amino phenol is used as colorless gum inhibitor.

5. Motor fuel according to claim 1, in which tricresol is used as the colorless gum inhibitor.

6. Motor fuel according to claim 1, in which secondary amyl para-amino phenol is used as colorless gum inhibitor.

7. A composition of matter comprising gasoline 99.977% approximately, tricresol 0.020% approximately, and the red dye obtained by the condensation of diphenylamine with paranitroso phenol 0.003% approximately, said dye and tricresol both having gum inhibiting power, and the tricresol tending to prevent the fading of the dye.

8. A motor fuel comprising cracked hydrocarbon spirits of the type normally tending to form gum containing a colorless gum inhibitor selected from aromatic amino and phenolic compounds in quantity sufficient to inhibit gum formation and an indophenol dye in quantity sufficient to impart color to the fuel and further stabilize the gasoline against gum formation.

9. Process for inhibiting gum formation in cracked gasoline, which comprises adding to the gasoline a minute amount of a dye inhibitor to color the gasoline to the desired extent and protect the same partly against the formation of gum, said dye being selected from the class consisting of indophenols and oxazine-, indamine-, eurhodine-, safranine-, and aposafranine bases, and also adding to the gasoline a small quantity of a colorless gum inhibitor selected from the class consisting of aromatic amines and phenolic compounds.

10. Process for inhibiting gum formation in cracked gasoline and stabilizing an inhibitor dye contained therein and selected from the group consisting of indophenols and oxazine-, indamine-, eurhodine-, safranine-, and aposafranine bases, which comprises adding thereto a small amount of a colorless gum inhibitor selected from the class consisting of aromatic amines and phenolic compounds.

11. Process for inhibiting gum formation in cracked hydrocarbon spirits of the type normally tending to form gum, which comprises adding to said spirits a colorless gum inhibitor selected from aromatic amino and phenolic compounds in quantity sufficient to inhibit gum formation and an indophenol dye in quantity sufficient to impart color to the fuel and further stabilize the gasoline against gum formation.

LEONARD E. SARGENT.
CARL WINNING.
JAMES F. DUDLEY.